United States Patent
Yang et al.

(10) Patent No.: US 9,935,491 B2
(45) Date of Patent: Apr. 3, 2018

(54) POLYPHASE POWER DISPATCHING SYSTEM AND METHOD

(71) Applicant: Industrial Technology Research Institute, Hsinchu (TW)

(72) Inventors: Kuo-Hsiang Yang, Hsinchu County (TW); An-Peng Wang, Kaohsiung (TW); Jen-Chao Lu, Taichung (TW); Su-Wei Wang, Hsinchu (TW); Chih-Chieh Chen, Taipei (TW); Szu-Kai Wang, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 225 days.

(21) Appl. No.: 14/964,495

(22) Filed: Dec. 9, 2015

(65) Prior Publication Data

US 2017/0104362 A1 Apr. 13, 2017

(30) Foreign Application Priority Data

Oct. 13, 2015 (TW) .............................. 104133562 A

(51) Int. Cl.
*H02J 7/34* (2006.01)
*H02J 7/00* (2006.01)

(52) U.S. Cl.
CPC .............. *H02J 7/34* (2013.01); *H02J 7/0068* (2013.01)

(58) Field of Classification Search
CPC .................................. H02J 7/34; H02J 7/0068
See application file for complete search history.

(56) References Cited

U.S. PATENT DOCUMENTS 3,450,983 A * 6/1969 Koppelmann ........ H02J 3/1835
323/210
8,143,879 B2 3/2012 Caird
(Continued)

FOREIGN PATENT DOCUMENTS

CN 102893480 1/2013
CN 103199564 7/2013
(Continued)

OTHER PUBLICATIONS

Kuo-Cheng Wang, "Design and Implementation of Parallel Type Three-phase Uninterruptible Power Supply Systems," National Taiwan University, Department of Electrical Engineering, Master's Thesis, Oct. 24, 2006.
(Continued)

*Primary Examiner* — Jared Fureman
*Assistant Examiner* — Emmanuel R Dominique
(74) *Attorney, Agent, or Firm* — JCIPRNET

(57) ABSTRACT

A polyphase power dispatching system and a polyphase power dispatching method are provided. The polyphase power dispatching system includes an electric meter, a single-phase electricity storage module, a switch and a control circuit. The electric meter can measure transmission statuses of power transmission lines of a polyphase power line group. The common terminal of the switch is connected to the single-phase electricity storage module. The selection terminals of the switch are connected to the power transmission lines in a one-to-one manner. The control circuit is connected to the electric meter and the switch. The control circuit can correspondingly control the switch based on the transmission status of each power transmission line, so that the switch selectively connects the single-phase electricity storage module to one of the power transmission lines.

19 Claims, 4 Drawing Sheets

(56) References Cited

U.S. PATENT DOCUMENTS

| | | | |
|---|---|---|---|
| 8,207,726 | B2 | 6/2012 | Vaswani et al. |
| 8,797,003 | B2 | 8/2014 | Yuzurihara et al. |
| 8,825,416 | B2 | 9/2014 | Arya et al. |
| 9,166,410 | B1* | 10/2015 | Kim .......................... H02J 3/26 |
| 2008/0112200 | A1 | 5/2008 | Tan et al. |
| 2012/0078428 | A1* | 3/2012 | Henderieckx ............. H02J 3/26 700/292 |
| 2012/0175951 | A1* | 7/2012 | Pamulaparthy ........... H02J 3/26 307/11 |
| 2015/0084423 | A1 | 3/2015 | Gamborg |
| 2015/0084434 | A1* | 3/2015 | Mousavi .................. H01H 9/54 307/116 |
| 2015/0102673 | A1 | 4/2015 | Alshinnawi et al. |
| 2016/0126737 | A1* | 5/2016 | Dijkhuizen ........... H02J 3/1857 307/46 |
| 2016/0359328 | A1* | 12/2016 | Hunt ........................ H02J 3/32 |

FOREIGN PATENT DOCUMENTS

| | | |
|---|---|---|
| CN | 104218610 | 12/2014 |
| CN | 204068262 | 12/2014 |
| TW | I348801 | 9/2011 |
| TW | I375394 | 10/2012 |
| TW | I377763 | 11/2012 |
| TW | M474292 | 3/2014 |
| TW | I443935 | 7/2014 |
| TW | I488415 | 6/2015 |
| WO | 2014118440 | 8/2014 |

OTHER PUBLICATIONS

Liaw et al., "A three-phase multi-functional battery energy storage system," 20th International Conference on Industrial Electronics, Control and Instrumentation, Sep. 5-9, 1994, pp. 458-463.

Liu et al., "A control method for 3-phase inverters enabling smooth transferring of the operation modes of distributed generation system," Transactions of China Electrotechnical Society of Xi'An Jiaotong University, May 2011, pp. 52-61.

Wang et al., "A Double-Loop Control Strategy for Three-Phase Inverter With Unbalanced Load ," Power system technology, Feb. 2013, pp. 398-404.

Jou et al., "The Study and Implementation of Three-Arms Three-Phase Four-Wire Active Power Filter," National Science Council Research Project Reports, Jul. 31, 2006, pp. 1-10.

Chih-Cheng Chang, the abstract of "Study of Three Phase Four-Wire Uninterruptible Power System," National Kaohsiung University of Applied Sciences, Department of Electrical Engineering, Master's thesis, 2011, pp. 1.

"Office Action of Taiwan Counterpart Application," dated May 9, 2016, p. 1-p. 7.

* cited by examiner

POLYPHASE POWER DISPATCHING SYSTEM AND METHOD

CROSS-REFERENCE TO RELATED APPLICATION

This application claims the priority benefit of Taiwan application serial no. 104133562, filed on Oct. 13, 2015. The entirety of the above-mentioned patent application is hereby incorporated by reference herein and made a part of specification.

TECHNICAL FIELD

The disclosure is directed to a power system and more particularly, to a polyphase power dispatching system and method.

BACKGROUND

In a three-phase power system, the three-phase power may be considered as consisting of three sets of single-phase power, in which a difference among the three sets of single-phase power is 120°. The three-phase power can be simultaneously provides to a plurality of three-phase load apparatuses and/or a plurality of single-phase load apparatuses. Even though the three-phase power can be simultaneously provided to the load apparatuses, factors, such as the single-phase load apparatuses using the power in the same phase among the three-phase power, the single-phase load apparatuses having different power consumption from one another, or the single-phase load apparatus having different turned-on periods, would lead the three sets of single-phase power in consuming different amounts of electricity. In the scenario that the three sets of single-phase power consumes different amounts of electricity, a power generating terminal (e.g., a utility power, a commercial power, or a supply mains) has to conform to the highest load of each single-phase power. In any way, the load unbalance status of the three set of the three-phase power would lead to energy loss and cause risks, such as an over large current and power trip-off of neutral lines of a user end.

SUMMARY

A polyphase power dispatching system and a polyphase power dispatching method for improving a load unbalance situation occurring among polyphase power are introduced herein.

According to an embodiment of the disclosure, a polyphase power dispatching system is introduced. The polyphase power dispatching system includes an electric meter, an electricity storage module, a switch and a control circuit. The electric meter is configured to measure a transmission status of a plurality of power transmission lines in a polyphase power line group. A common terminal of the switch is connected to the electricity storage module, and a plurality of selection terminals of the switch is to the electricity storage module. The control circuit is connected to the electric meter and the switch. The control circuit is configured to correspondingly control the switch according to the transmission status of each of the power transmission lines, such that the switch selectively connects the electricity storage module to one of the power transmission lines.

According to an embodiment of the disclosure, a polyphase power dispatching method is introduced. The polyphase power dispatching method includes: measuring a transmission status of a plurality of power transmission lines in a polyphase power line group by an electric meter; and correspondingly and selectively connecting an electricity storage module to one of the power transmission lines according to the transmission status of each of the power transmission lines by a switch.

Based on the above, the polyphase power dispatching system of the embodiment of the disclosure can dynamically connect the electricity storage module to one of the power transmission lines according to the transmission status of each of the polyphaser power transmission lines to improve the load unbalance situation occurring among the polyphase power.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF EMBODIMENTS

Figure 1:
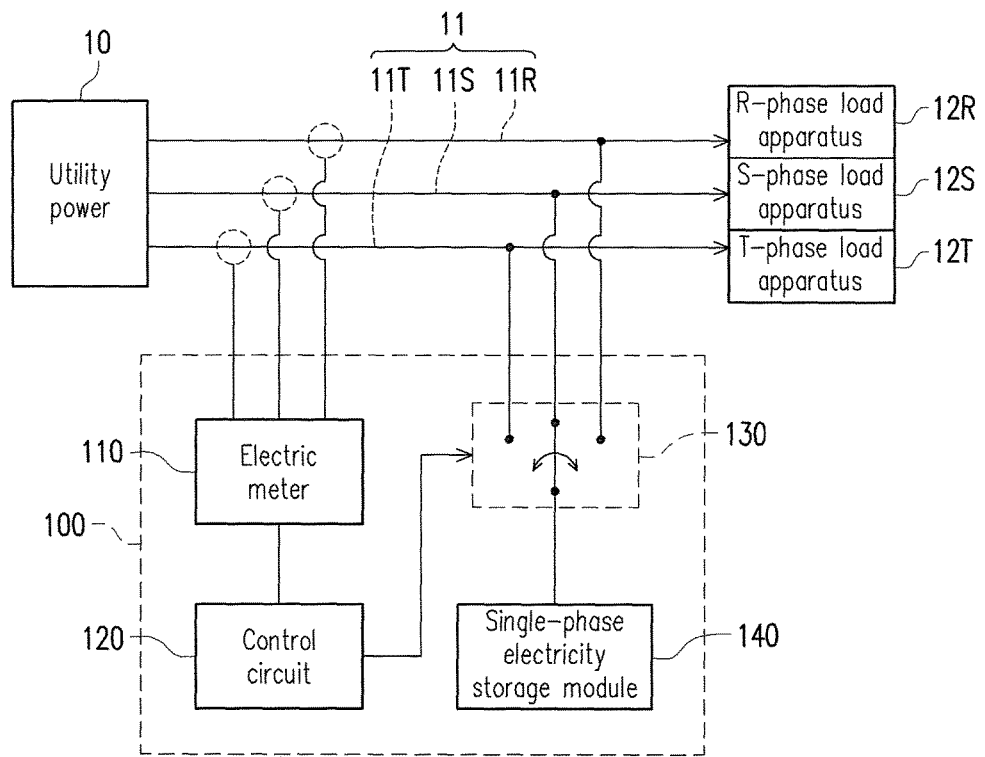
FIG. 1 is a schematic circuit block diagram illustrating a polyphase power dispatching system according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The term "coupling" or "coupled" used in this specification (including claims) may refer to any direct or indirect connection means. For example, "a first device is coupled to a second device" should be interpreted as "the first device is directly connected to the second device" or "the first device is indirectly connected to the second device through other devices or connection means." Moreover, wherever appropriate in the drawings and embodiments, elements/components/steps with the same reference numerals represent the same or similar parts. Elements/components/steps with the same reference numerals or names in different embodiments may be cross-referenced.

FIG. 1 is a schematic circuit block diagram illustrating a polyphase power dispatching system 100 according to an embodiment of the disclosure. A utility power 10 (a commercial power, or a supply mains) illustrated in FIG. 1 may be any type of polyphaser power source. The utility power 10 may transmit a polyphaser power to a plurality of load apparatuses (including an R-phase load apparatus 12R, an S-phase load apparatus 12S and a T-phase load apparatus 12T in FIG. 1) through a polyphase power line group 11. The circuit diagram of FIG. 1 illustrates a three-phase power as an implementation example; however, the other embodiments are not limited thereto. Taking the three-phase power for example, the polyphase power line group 11 includes three power transmission lines 11R, 11S and 11T, so as to transmit the power in three phases to the load apparatuses. The polyphase power dispatching system 100 includes an electric meter 110, a control circuit 120, a switch 130 and an electricity storage module (e.g. single-phase electricity storage module 140). The switch 130 may be a power switch or a high-power semiconductor element. A common terminal of the switch 130 is connected to the single-phase electricity storage module 140. A plurality of selection terminals of the switch is connected to the power transmission lines 11R, 11S and 11T in a one-to-one manner, as shown inn FIG. 1. The embodiment illustrated in FIG. 1 is implemented by using a single-phase electricity storage module 140 operated with a switch 130. In other embodiments, the polyphase power dispatching system 10 may include a plurality of single-phase electricity storage modules 140 connected in parallel to the common terminal of the switch 130.

Figure 2:
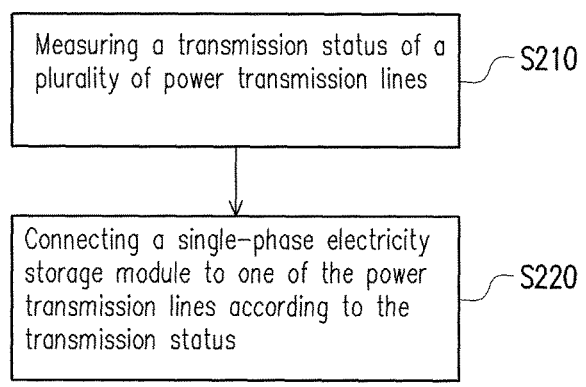
FIG. 2 is a schematic flowchart illustrating a polyphase power dispatching method according to an embodiment of the disclosure.

FIG. 2 is a schematic flowchart illustrating a polyphase power dispatching method according to an embodiment of the disclosure. Referring to FIG. 1 and FIG. 2, in step S210, the electric meter 110 measures a transmission status (load status) of each of the power transmission lines 11R, 11S and 11T in a polyphase power line group 11 and then, informs the control circuit 120 of the transmission status (load status) of each of the power transmission lines 11R, 11S and 11T. In some embodiments (but not limited thereto), the electric meter 110 measures electricity of each of the power transmission lines 11R, 11S and 11T and serves the electricity as the transmission status (load status) of each of the power transmission lines 11R, 11S and 11T. The control circuit 120 is connected to the electric meter 110 and the switch 130. The control circuit 120 determines three-phase power information measured by the electric meter 110. In step S220, the control circuit 120 correspondingly controls the switch 130 according to the transmission status (load status) of each of the power transmission lines 11R, 11S and 11T, such that the switch 130 selectively connects the single-phase electricity storage module 140 to one of the power transmission lines 11R, 11S and 11T.

In some application scenarios, each of the power transmission lines 11R, 11S and 11T may be in a power-load unbalance status. For example, some factors, such as the R-phase load apparatus 12R, the S-phase load apparatus 12S and the T-phase load apparatus 12T using the power in the same phase among the three-phase power, the R-phase load apparatus 12R, the S-phase load apparatus 12S and the T-phase load apparatus 12T having different power consumption from one another, or the R-phase load apparatus 12R, the S-phase load apparatus 12S and the T-phase load apparatus 12T having different turned-on periods would lead the power transmission lines 11R, 11S and 11T to consume different amount of electricity (i.e., have different transmission statuses or load statuses), such that the power transmission lines 11R, 11S and 11T are in the power-load unbalance status. The power-load unbalance status may be defined depending on design requirements.

When the transmission status indicates that the power transmission lines 11R, 11S and 11T are in the power-load unbalance status, the control circuit 120 controls the switch 130 to connect the single-phase electricity storage module 140 to one of the power transmission lines 11R, 11S and 11T "which does not have the lowest power loading", such that the single-phase electricity storage module 140 provides power to the one of the power transmission lines 11R, 11S and 11T "which does not have the lowest power loading".

For example, if a current of the power transmission line 11R is smaller than currents of the power transmission lines 11S and 11T, and the current of the power transmission line 11S is smaller than the current of the power transmission line 11T, the power transmission line 11R is the transmission line "which has the lowest power loading", the power transmission lines 11S and 11T are the ones "which do not have the lowest power loading", and the power transmission line 11T is the transmission line "which has the highest power loading". When the transmission status indicates that each of the power transmission lines 11R, 11S and 11T are in the power-load unbalance status, the switch 130 connects the single-phase electricity storage module 140 to the power transmission line 11S or 11T (i.e., the one "which does not have the lowest power loading"), such that the single-phase electricity storage module 140 and the utility power 10 jointly provide power to the power transmission line 11S or 11T. In some embodiments, the one of the power transmission lines "which does not have the lowest power loading" may be the one of the power transmission lines 11R, 11S and 11T "which has the highest power loading" (e.g., the power transmission line 11T). When the transmission status indicates that each of the power transmission lines 11R, 11S and 11T is in the power-load unbalance status, the switch 130 connects the single-phase electricity storage module 140 to the power transmission lines 11T (i.e., the one "which has the highest power loading"), such that the single-phase electricity storage module 140 and the utility power 10 jointly provide power to the power transmission lines 11T. Thus, the polyphase power dispatching system 100 dynamically provides the power of the single-phase electricity storage module 140 to one of the power transmission lines 11R, 11S and 11T according to the transmission status of the polyphase power line group 11 to improve the load unbalance situation occurring among the polyphase power.

In some other embodiments, the control circuit 120 is further connected to the single-phase electricity storage module 140 to obtain an electricity amount of the single-phase electricity storage module 14. The control circuit 120 determines a size of a electricity amount of the single-phase electricity storage module 140. When the single-phase electricity storage module 140 is in a low power status, the control circuit 120 controls the switch 130 to connect the single-phase electricity storage module 140 to one of the power transmission lines 11R, 11S and 11T "which does not have the highest power loading", such that the one of the power transmission lines 11R, 11S and 11T "which does not have the highest power loading" provides power to charge the single-phase electricity storage module 140. The low power status may be defined depending on design requirements.

For example, if it is assumed that the current of the power transmission line 11R is smaller than the currents of the power transmission lines 11S and 11T, and the current of the power transmission line 11S is smaller than the current of the power transmission line 11T, the power transmission line 11T is the one "which has the highest power loading", the power transmission lines 11R and the 11S are the ones "which do not have the highest power loading", and the power transmission line 11R is the one "which has the lowest power loading". When the single-phase electricity storage module 140 is in the low power status, the switch 130 connects the single-phase electricity storage module 140 to the power transmission line 11R or 11S ("which does not have the highest power loading"), such that the power transmission line 11R or 11S provides power to charge the single-phase electricity storage module 140. In some embodiments, the one of the power transmission lines "which does not have the highest power loading" may be one of the power transmission lines 11R, 11S and 11T "which has the lowest power loading" (e.g., the power transmission lines 11R). When the single-phase electricity storage module 140 is in the low power status, the switch 130 connects the single-phase electricity storage module 140 to the power transmission lines 11R ("which has the lowest power loading"), such that the power transmission line 11R provides power to charge the single-phase electricity storage module 140. Thus, the polyphase power dispatching system 100 may dynamically charge the single-phase electricity storage module 140 by using the power of one of the power transmission lines 11R, 11S and 11T according to the transmission status of the polyphase power line group 11 to improve the load unbalance situation occurring among the polyphase power.

The control circuit 120 determines the three-phase power information measured by the electric meter 110 and the size of the electricity amount of the single-phase electricity storage module 140. In some application scenarios, the power transmission lines 11R, 11S and 11T may be in a power-load balance status, and the single-phase electricity storage module 14 may be in a sufficient power status. The sufficient power status may be defined depending on design requirements. When the transmission status of the polyphase power line group 11 indicates that the power transmission lines 11R, 11S and 11T are in the power-load balance status, and when the single-phase electricity storage module 140 is in the sufficient power status, the control circuit 120 controls the switch 130 to disconnect the single-phase electricity storage module 140 from the power transmission lines 11R, 11S and 11T.

In some other application scenarios, the power transmission lines 11R, 11S and 11T may be in the power-load balance status, but the single-phase electricity storage module 140 may be in the low power status. When the transmission status of the polyphase power line group 11 indicates that each of the power transmission lines 11R, 11S and 11T is in the power-load balance status, and the single-phase electricity storage module 140 is in the low power status, the control circuit 120 controls the switch 130 to connect the single-phase electricity storage module 140 to one of the power transmission lines 11R, 11S and 11T by turns in a time-sharing manner, such that the power transmission lines 11R, 11S and 11T take turns to provide power to charge the single-phase electricity storage module 140.

Figure 3:
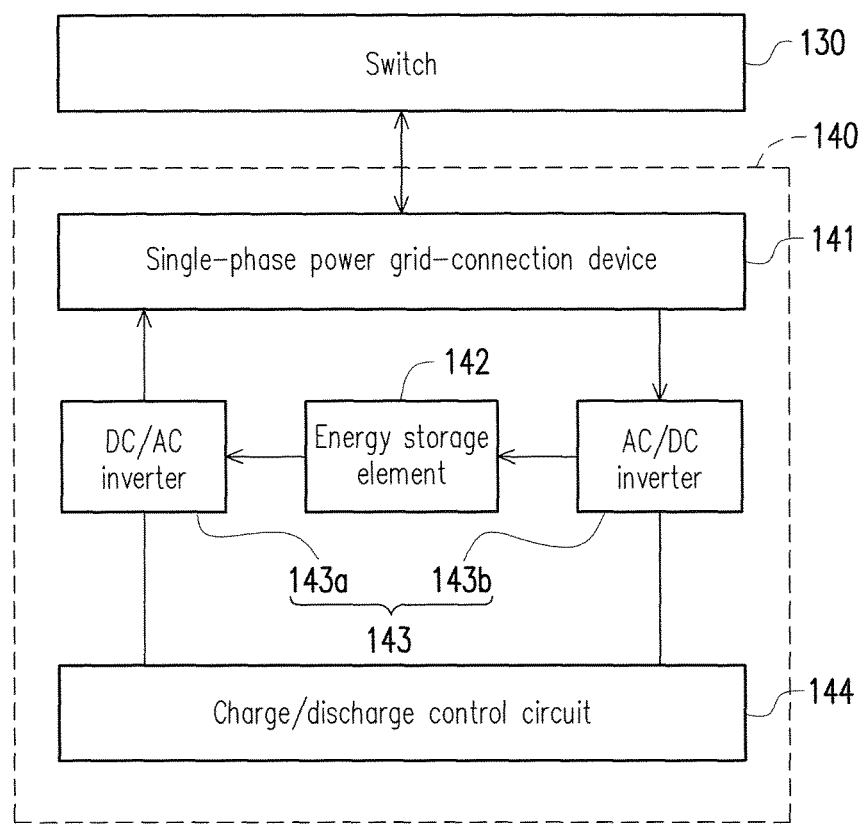
FIG. 3 is a schematic circuit block diagram illustrating the single-phase electricity storage module depicted in FIG. 1 according to an embodiment of the disclosure.

FIG. 3 is a schematic circuit block diagram illustrating the single-phase electricity storage module 140 depicted in FIG. 1 according to an embodiment of the disclosure. The single-phase electricity storage module 140 includes a single-phase power grid-connection device 141, an energy storage element 142, a power inverter module 143 and a charge/discharge control circuit 144. The single-phase power grid-connection device 141 is connected between the power inverter module 143 and the switch 130. The single-phase power grid-connection device 141 may be a conventional element and thus, will not be repeatedly described. The energy storage element 142 is connected to the power inverter module 143. The charge/discharge control circuit 144 is connected to the power inverter module 143. The charge/discharge control circuit 144 controls the power inverter module 143 to provide the power of the energy storage element 142 to the common terminal of the switch 130 or provides the power of the common terminal of the switch 130 to the energy storage element 142. Based on the control of the charge/discharge control circuit 144, the power inverter module 143 may perform power adjustment on the output AC current by employing a pulse width modulation (PWM) mode.

In the embodiment illustrated in FIG. 3, the power inverter module 143 includes a DC/AC inverter 143a and an AC/DC inverter 143b. The DC/AC inverter 143a is connected to the energy storage element 142 and the single-phase power grid-connection device 141. Based on the control of the charge/discharge control circuit 144, the DC/AC inverter 143a performs a DC-to-AC conversion, such that the power of the energy storage element 142 is provided to the common terminal of the switch 130 through the single-phase power grid-connection device 141. The AC/DC inverter 143b is connected to the energy storage element 142. Based on the control of the charge/discharge control circuit 144, the AC/DC inverter 143b performs AC-to-DC conversion, such that the power of the common terminal of the switch 130 is provided to the energy storage element 142 through the single-phase power grid-connection device 141.

In other embodiments, the power inverter module 143 may include a plurality of rated-output power inverter modules (not shown). The rated-output power inverter modules (not shown) are connected to the energy storage element 142. The rated-output power inverter modules (not shown) are selectively enabled or disabled based on the control of the charge/discharge control circuit 144, such that the power of the energy storage element 142 is provided to the common terminal of the switch 130 through the single-phase power grid-connection device 141, or the power of the common terminal of the switch 130 is provided to the energy storage element 142 through the single-phase power grid-connection device 141.

Figure 4:
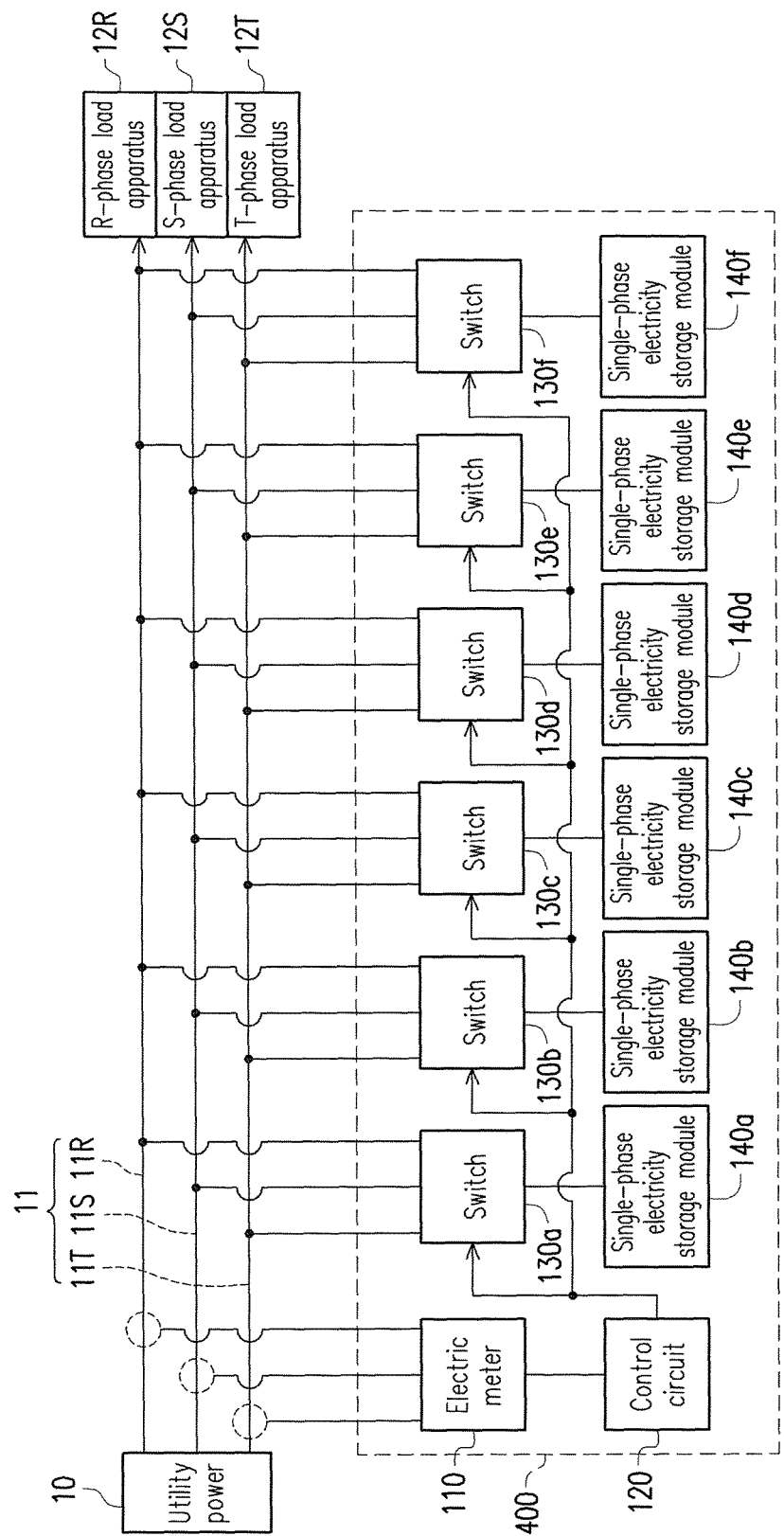
FIG. 4 is a schematic circuit block diagram illustrating a polyphase power dispatching system according to another embodiment of the disclosure.

The polyphase power dispatching system 100 illustrated in FIG. 1 employs one switch 130 and one single-phase electricity storage module 140. In any way, the numbers of the switch and the single-phase electricity storage module may be determined depending on design requirements. In other embodiments, the polyphase power dispatching system may employ a plurality of switches and a plurality of single-phase electricity storage modules. For example, FIG. 4 is a schematic circuit block diagram illustrating a polyphase power dispatching system 400 according to another embodiment of the disclosure. The utility power 10, the power line group 11, the power transmission lines 11R, the power transmission lines 11S, the power transmission lines 11T, the R-phase load apparatus 12R, the S-phase load apparatus 12S and the T-phase load apparatus 12T illustrated in FIG. 4 me be deduced with reference to the descriptions related to FIG. 1 to FIG. 2 and thus, will not be repeated. The polyphase power dispatching system 400 includes the electric meter 110, the control circuit 120, switches 130a, 130b, 130c, 130d, 130e, 130f, single-phase electricity storage modules 140a, 140b, 140c, 140d, 140e and 140f. The polyphase power dispatching system 400, the electric meter 110, the control circuit 120, the switches 130a-130f and the single-phase electricity storage modules 140a-140f illustrated in FIG. 4 may be deduced with reference to the descriptions related to the polyphase power dispatching system 100, the electric meter 110, the control circuit 120, the switch 130 and the single-phase electricity storage module 140 illustrated in FIG. 1 to FIG. 3 and thus, will not be repeated. The connection relation between the single-phase electricity storage modules 140a-140f and the power transmission lines 11R, 11S, 11T may be arbitrarily dispatched by the control circuit 120. The disclosure is not intent to limit that one phase is connected to only one single-phase electricity storage module.

Figure 5:
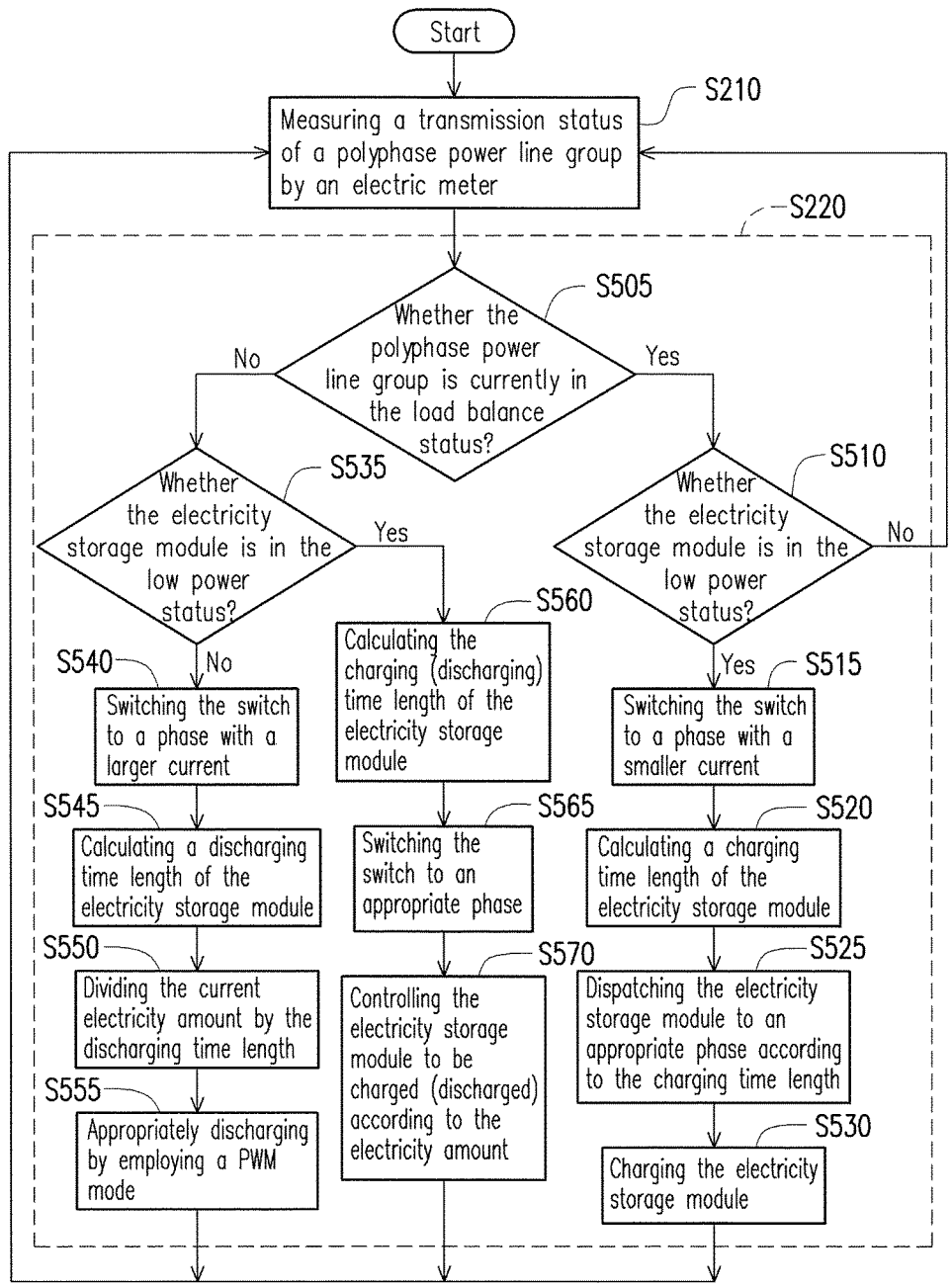
FIG. 5 is a schematic flowchart illustrating a polyphase power dispatching method according to another embodiment of the disclosure.

FIG. 5 is a schematic flowchart illustrating a polyphase power dispatching method according to another embodiment of the disclosure. Referring to FIG. 4 and FIG. 5, in step S210, the electric meter 110 measures the transmission status (load status) of each of the power transmission lines 11R, 11S and 11T in the polyphase power line group 11, and then informs the control circuit 120 of the transmission status (load status) of each of the power transmission lines 11R, 11S and 11T. In the present embodiment, the electric meter 110 measure the current size of each of the power transmission lines 11R, 11S and 11T and serves the current size as the transmission status (load status) of each of the power transmission lines 11R, 11S and 11T. In step S220, the control circuit 120 correspondingly controls the switch 130 according to the transmission status (load status) of each of the power transmission lines 11R, 11S and 11T, such that the switch 130 selectively connects the single-phase electricity storage module 140 to one of the power transmission lines 11R, 11S and 11T. In the present step S220 includes sub steps S505 to S570.

In step S505, the control circuit 120 regularly (or irregularly) reads the transmission status of the polyphase power line group 11 (e.g., three-phase power, the three-phase current, or other load information) measured by the electric meter 110 and determines whether the three-phase power of the polyphase power line group 11 is currently in the load balance status. If the three-phase power is currently in the load balance status, step S510 is performed to determine whether any one of the single-phase electricity storage modules 140a-140 is in the low power status. When all of the single-phase electricity storage modules 140a-140f are in the sufficient power status, the control circuit 120 controls the switches 130a-130f to disconnect all of the single-phase electricity storage modules 140a-140f from the power transmission lines 11R, 11S and 11T, and step S210 is returned to.

When one or more of the single-phase electricity storage modules 140a-140f are determined as being in the low power status, the control circuit 120 performs steps S515 to S530, so as to dispatch the single-phase electricity storage modules with insufficient power to be charged, without breaking the load balance status of the current polyphase power line group 11. In step S515, the control circuit 120 controls the switches 130a-130f to connect the single-phase electricity storage modules 140a-140f to the power transmission lines 11R, 11S and 11T which have lower currents. In step S520, the control circuit 120 calculates a charging time length of each of the single-phase electricity storage modules 140a-140f according to a current electricity amount of each of the single-phase electricity storage modules 140a-140f.

Based on the calculation result (the charging time length) of step S520, in step S525, the control circuit 120 controls the switches 130a-130f to dispatch each single-phase electricity storage module which has insufficient power to the appropriate power transmission line. For example, if it is assumed that the electricity storage modules 140d, 140e, 140f among the single-phase electricity storage modules 140a-140f are in the low power status (e.g., having the electricity amount lower than 50%), in step S525, the control circuit 120 controls the switch 130d to connect the single-phase electricity storage module 140d to the power transmission line 111R, controls the switch 130e to connect the single-phase electricity storage module 140e to the power transmission line 111S and controls the switch 130f to connect the single-phase electricity storage module 140f to the power transmission line 111T. After step S525, in step S530, the control circuit 120 controls the single-phase electricity storage modules (e.g., 140d, 140e, 140f) which have insufficient electricity to be charged, and step S210 is returned to.

When the current three-phase power of the polyphase power line group 11 is determined as being in an unbalance status in step S505, the control circuit 120 performs step S535. In step S535, the control circuit 120 determines whether any one of the single-phase electricity storage modules 140a-140f is in the low power status. For an electricity storage module in the sufficient power status (e.g., having the electricity amount more than 50%) among the single-phase electricity storage modules 140a-140f, the control circuit 120 performs steps S540 to S555 to dispatch a single-phase electricity storage module with sufficient power (in the sufficient power status) and discharge therefrom to a phase with high power consumption (i.e., a power transmission line having the highest power loading). For an electricity storage module in the low power status (e.g., having the electricity amount less than 50%) among the single-phase electricity storage modules 140a-140f, the control circuit 120 performs steps S560 to S570 to dispatch a phases with low power consumption (a power transmission line having a lower power loading) to appropriately charge the single-phase electricity storage module in the low power status.

In step S540, the control circuit 120 controls one of the switches 130a-130f to connect the single-phase electricity storage module with sufficient power to the phase with high power consumption (i.e., the power transmission line having the highest power loading). In step S545, the control circuit 120 calculates a discharging time length of each of the single-phase electricity storage modules 140a-140f in the sufficient power status according to the current electricity amount of each of the electricity storage modules. In step S550, for each of the single-phase electricity storage modules, the control circuit 120 divides the current electricity amount by the discharging time length to obtain a discharge amount per unit time of each of the single-phase electricity storage modules. Based on the calculation result (the discharge amount per unit time) of step S550, in step S555, the control circuit 120 controls each of the single-phase electricity storage modules in the sufficient power status to release the power to the phase with high power consumption (i.e., the power transmission line having the highest power loading) by employing the PWM mode. After step S555, the control circuit 120 returns to step S210.

In step S560, the control circuit 120 calculates the charging time length of each of the electricity storage modules according to the current electricity amount of each of the electricity storage modules in the low power status (e.g., having the electricity amount lower than 50%). Based on the calculation result (the charging time length) of step S560, in step S565, the control circuit 120 controls the switches 130a-130f to dispatch and connect the single-phase electricity storage modules with insufficient power to the appropriate power transmission lines. For example, if it is assumed that the current of the power transmission line 11R is larger than the current of the power transmission line 111S, and the current of the power transmission line 111S is larger than the current of the power transmission line 111T. It is further assumed that the single-phase electricity storage modules 140d, 140e, 140f among the single-phase electricity storage modules 140a-140f are in the low power status (e.g., having the electricity amount lower than 50%), in which the electricity amount of the electricity storage modules 140d is 35%, the electricity amount of the electricity storage modules 140e is 20%, and the electricity amount of the electricity storage modules 140f is 5%. In step S525, the control circuit 120 controls the switch 130d to connect the single-phase electricity storage module 140d to the power transmission line 111S, controls the switch 130e to connect the single-phase electricity storage module 140e to the power transmission line 111T and controls the switch 130f to connect the single-phase electricity storage module 140f to the power transmission line 111T. After step S565, the control circuit 120 controls the single-phase electricity storage modules (e.g., the 140d, 140e, 140f) with insufficient power to be charged in step S570 and returns to step S210.

It should be noted that in different application scenarios, the capabilities of the control circuit 120 and/or the charge/discharge control circuit 144 may be implemented in forms of software, firmware or hardware by employing a general programming language (e.g., C or C++), a hardware description language (e.g., Verilog HDL or VHDL) or other suitable programming languages. The software (or firmware) capable of executing the functions may be deployed in any computer-accessible media, such as magnetic tapes, semiconductor memories, magnetic disks or compact disks (e.g., CD-ROM or DVD-ROM) or may be delivered through the Internet, wired communication, wireless communication or other communication media. The software (or firmware) may be stored in the computer-accessible media for a processor of the computer to access/execute the programming codes of the software (or firmware). Moreover, the apparatus and method introduced in the disclosure may be implemented by means of a combination of hardware and software.

In light of the foregoing, the polyphase power dispatching system introduced according to each of the embodiments of the disclosure can flexibly and dynamically dispatch the single-phase electricity storage module to charge/discharge the power transmission lines with a variety of phases according to the electricity amount of the single-phase electricity storage module and the level of the polyphase power load. When the electric meter measures that the polyphase power load is in the unbalance status, the control circuit determines according to the current electricity amount of the single-phase electricity storage module and the power consumption of the three-phase power. If the single-phase electricity storage module has low electricity storage, the single-phase electricity storage module is dispatched to the phase with low power consumption for charging. On the contrary, when the single-phase electricity storage module has sufficient electricity storage, the single-phase electricity storage module is dispatched to the phase with high power consumption for discharging. The polyphase power dispatching system can be configured with a plurality of electricity storage modules to be use in parallel simultaneously. The switch is individually controlled by the control circuit for phase switching, and thereby, the polyphase power dispatching system can facilitate in improving the balance issue of the three-phase power load.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A polyphase power dispatching system, comprising:
   an electric meter, configured to measure a transmission status of a plurality of power transmission lines in a polyphase power line group;
   an electricity storage module, comprising a single-phase electricity storage module;
   a switch, having a common terminal connected to the electricity storage module, and having a plurality of selection terminals connected to the power transmission lines in a one-to-one manner; and
   a control circuit, connected to the electric meter and the switch, and configured to correspondingly control the switch according to the transmission status of each of the power transmission lines, such that the switch selectively connects the electricity storage module to one of the power transmission lines,
   wherein the control circuit is further connected to the single-phase electricity storage module to obtain an electricity amount of the single-phase electricity storage module,
   when the single-phase electricity storage module is in a low power status, the control circuit controls the switch to connect the single-phase electricity storage module to one of the power transmission lines which does not have the highest power loading, such that the one of the power transmission lines which does not have the highest power loading provides power to charge the single-phase electricity storage module.

2. The polyphase power dispatching system according to claim 1, wherein when the transmission status indicates that the power transmission lines are in a power-load unbalance status, the control circuit controls the switch to connect the single-phase electricity storage module to one of the power transmission lines which does not have the lowest power loading within the polyphase power line group, such that the single-phase electricity storage module provides power to the one of the power transmission lines which does not have the lowest power loading.

3. The polyphase power dispatching system according to claim 2, wherein the one of the power transmission lines which does not have the lowest power loading is one of the power transmission lines which has the highest power loading.

4. The polyphase power dispatching system according to claim 1, wherein the one of the power transmission lines which does not have the highest power loading is one of the power transmission lines which has the lowest power loading.

5. The polyphase power dispatching system according to claim 1, wherein
   the control circuit is further connected to the single-phase electricity storage module to obtain an electricity amount of the single-phase electricity storage module; and
   when the transmission status indicates that the power transmission lines are in a power-load balance status, and when the single-phase electricity storage module is in a sufficient power status, the control circuit controls the switch to disconnect the single-phase electricity storage module from the power transmission lines.

6. The polyphase power dispatching system according to claim 1, wherein the control circuit is further connected to the single-phase electricity storage module to obtain an electricity amount of the single-phase electricity storage module; and when the transmission status indicates that the power transmission lines is in a power-load balance status, and when the single-phase electricity storage module is in a low power status, the control circuit controls the switch to connect the single-phase electricity storage module to one of the power transmission lines by turns in a time-sharing manner, such that the power transmission lines take turns to provide power to charge the single-phase electricity storage module.

7. The polyphase power dispatching system according to claim 1, wherein the single-phase electricity storage module comprises:
an energy storage element;
a power inverter module, connected to the energy storage element; and
a charge/discharge control circuit, connected to the power inverter module, configured to control the power inverter module to provide power of the energy storage element to the common terminal of the switch or provide power of the common terminal of the switch to the energy storage element.

8. The polyphase power dispatching system according to claim 7, wherein the power inverter module comprises:
a DC/AC inverter, connected to the energy storage element and configured to perform DC-to-AC conversion based on the control of the charge/discharge control circuit, so as to provide the power of the energy storage element to the common terminal of the switch; and
an AC/DC inverter, connected to the energy storage element and configured to perform AC-to-DC conversion based on the control of the charge/discharge control circuit, so as to provide the power of the common terminal of the switch to the energy storage element.

9. The polyphase power dispatching system according to claim 7, wherein the single-phase electricity storage module further comprises:
a single-phase power grid-connection device, connected between the power inverter module and the switch.

10. The polyphase power dispatching system according to claim 7, wherein based on the control of the charge/discharge control circuit, the power inverter module performs power adjustment on an output AC current by employing a pulse width modulation mode.

11. A polyphase power dispatching method, comprising:
measuring a transmission status of a plurality of power transmission lines in a polyphase power line group by an electric meter; and
correspondingly and selectively connecting an electricity storage module to one of the power transmission lines according to the transmission status of each of the power transmission lines by a switch, wherein the electricity storage module comprises a single-phase electricity storage module,
wherein the step of connecting the electricity storage module to one of the power transmission lines comprises:
when the single-phase electricity storage module is in a low power status, connecting the single-phase electricity storage module to one of the power transmission lines which does not have the highest power loading by the switch, such that the one of the power transmission lines which does not have the highest power loading provides power to charge the single-phase electricity storage module.

12. The polyphase power dispatching method according to claim 11, wherein the step of connecting the electricity storage module to one of the power transmission lines comprises:
when the transmission status indicates that the power transmission lines are in a power-load unbalance status, connecting the single-phase electricity storage module to one of the power transmission lines which does not have the lowest power loading by the switch, such that the single-phase electricity storage module provides power to the one of the power transmission lines which does not have the lowest power loading.

13. The polyphase power dispatching method according to claim 12, wherein the one of the power transmission lines which does not have the lowest power loading is one of the power transmission lines which has the highest power loading.

14. The polyphase power dispatching method according to claim 11, wherein the one of the power transmission lines which does not have the highest power loading is one of the power transmission lines which has the lowest power loading.

15. The polyphase power dispatching method according to claim 11, wherein the step of connecting the electricity storage module to one of the power transmission lines comprises:
when the transmission status indicates that the power transmission lines are in a power-load balance status, and when the single-phase electricity storage module is in a sufficient power status, disconnecting the single-phase electricity storage module from the power transmission lines by the switch.

16. The polyphase power dispatching method according to claim 11, wherein the step of connecting the electricity storage module to one of the power transmission lines comprises:
when the transmission status indicates that the power transmission lines is in a power-load balance status, and when the single-phase electricity storage module is in a low power status, connecting the single-phase electricity storage module to one of the power transmission lines by turns in a time-sharing manner by the switch, such that the power transmission lines take turns to provide power to charge the single-phase electricity storage module.

17. The polyphase power dispatching method according to claim 11, wherein the single-phase electricity storage module comprises an energy storage element, a power inverter module and a charge/discharge control circuit, and the step of connecting the electricity storage module to one of the power transmission lines comprises:
controlling the power inverter module by the charge/discharge control circuit, so as to provide power of the energy storage element to the common terminal of the switch or provide power of the common terminal of the switch to the energy storage element.

18. The polyphase power dispatching method according to claim 17, wherein the power inverter module comprises a DC/AC inverter and an AC/DC inverter, and the step of connecting the electricity storage module to one of the power transmission lines further comprises:
performing DC-to-AC conversion, by the DC/AC inverter, based on the control of the charge/discharge control circuit, so as to provide the power of the energy storage element to the common terminal of the switch; and performing AC-to-DC conversion, by the AC/DC inverter, based on the control of the charge/discharge control circuit, so as to provide the power of the common terminal of the switch to the energy storage element.

19. The polyphase power dispatching method according to claim 17, wherein the step of controlling the power inverter module comprises:

performing power adjustment on an output AC current by employing a pulse width modulation mode based on the control of the charge/discharge control circuit.

* * * * *